United States Patent [19]
Popat et al.

[11] Patent Number: 5,892,892
[45] Date of Patent: Apr. 6, 1999

[54] COMPUTER-PRINTABLE ADHESIVE NOTE SYSTEM

[75] Inventors: Ghanshyam N. Popat, Alta Loma; Christopher Richard Wood, Pasadena, both of Calif.

[73] Assignee: Avery Dennison Corporation, Pasadena, Calif.

[21] Appl. No.: 723,011

[22] Filed: Sep. 30, 1996

[51] Int. Cl.⁶ .............................. G06F 15/00; G06K 1/00
[52] U.S. Cl. ......................... 395/111; 395/108; 395/117; 399/1; 399/8
[58] Field of Search .................................... 395/108, 109, 395/111, 117, 114; 399/1, 8, 81; 283/67, 81, 117; 101/483

[56] References Cited

U.S. PATENT DOCUMENTS

| | | | |
|---|---|---|---|
| 4,995,641 | 2/1991 | Landry et al. | 283/67 |
| 5,575,574 | 11/1996 | Mertens | 101/93.01 |
| 5,618,062 | 4/1997 | Mertens et al. | 283/67 |

OTHER PUBLICATIONS

Avery LabelPro for Windows Software (1993, 1994). Copy of User's Guide.

Post–it–Notes Design Software for Windows (1996). Copy of User's Guide.

*Primary Examiner*—Edward L. Coles
*Assistant Examiner*—Mark Wallerson
*Attorney, Agent, or Firm*—Oppenheimer Wolff & Donnelly LLP

[57] ABSTRACT

A computer-printable adhesive note system configures a computer and a printer to print information on self-sticking adhesive notes. The system includes a note assembly and a plurality of instructions in the form of computer code. The note assembly includes a printing sheet with a strip of pressure-sensitive adhesive applied on one side thereof and covered by a backing sheet. The printing sheet is divided into a plurality of notes by lines of perforations. The plurality of instructions are installed on a computer and may utilize an existing word-processing program on the computer. The plurality of instructions configure the computer to receive, from a keyboard of the computer, information to be printed on the printing sheet of one of the notes of the note assembly. The plurality of instructions then configure the printer to print the received information on the printing sheet of one of the notes of the note assembly.

37 Claims, 6 Drawing Sheets

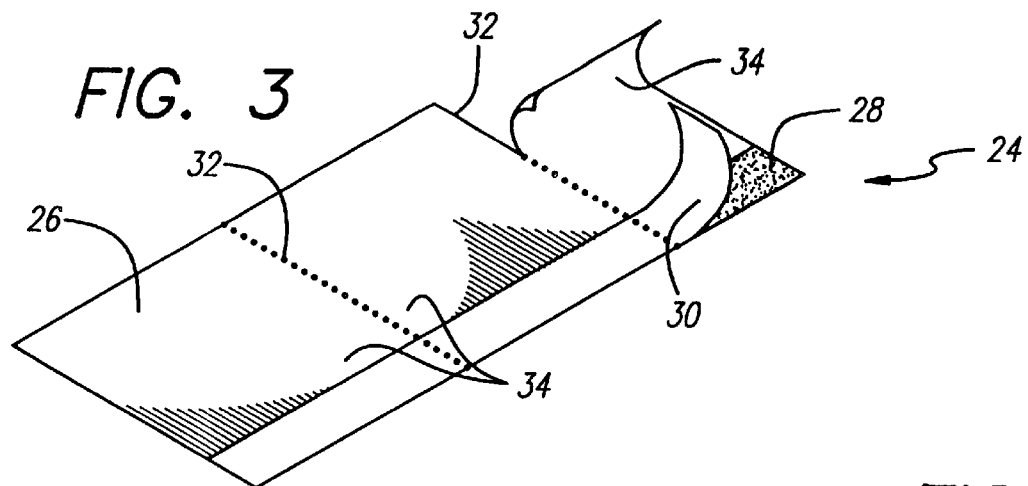
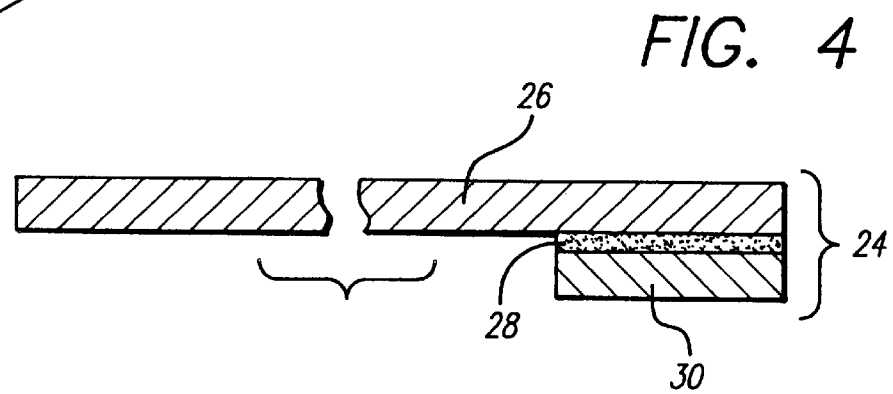
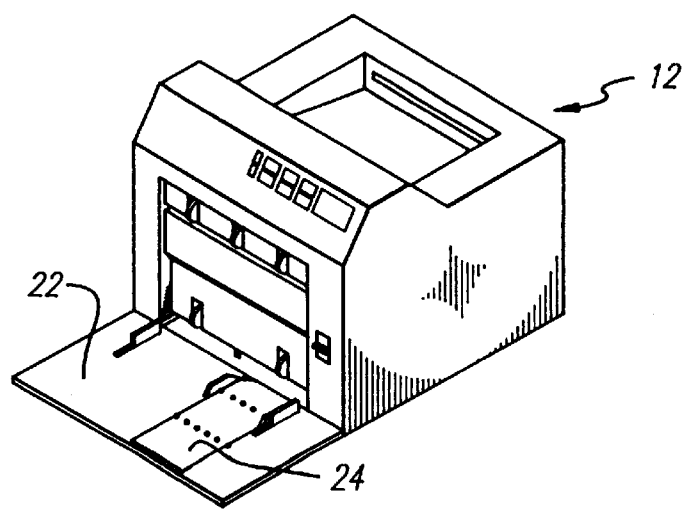
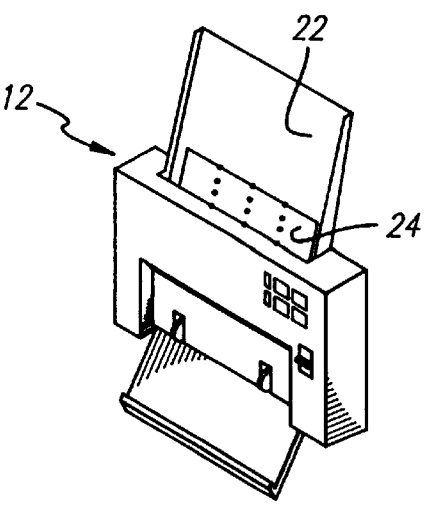

COMPUTER-PRINTABLE ADHESIVE NOTE SYSTEM

FIELD OF THE INVENTION

The present invention relates to a computerized printing system and, more particularly, to a computerized printing system in which adhesive notes are printable.

BACKGROUND OF THE INVENTION

Adhesive notes, such as Post-its® Notes produced by Minnesota Mining and Manufacturing (3M), are ubiquitous in homes and offices around the world. The yellow, pink, blue, and fluorescent notes are used for everything from bookmarks to memoranda to labels to phone-message pads.

The great utility of adhesive notes lies in the pressure-sensitive adhesive (PSA) applied in a strip along one edge, which adhesive is of the removable or repositionable type. The PSA strip allows a plurality of sheets, typically about 100, to be adhered together to form a note pad. Individual notes are then written upon, removed from the pad, and adhered to a surface. The notes can then be easily removed, without adhesive remaining behind on the surface, and re-adhered to another surface.

As mentioned, the user writes information on the note in his or her own hand. In many instances it may be desirable to have a more professionally appearing note than that which is achievable with personal penmanship, particularly in a corporate environment. Further, it may be desirable to create "application specific" notes on which a template of information is printed with additional information being printed on the note on a per-use basis. With current adhesive note pads, such professionally appearing or application-specific adhesive notes are not possible.

Avery Dennison Corporation, which is the assignee of the present invention, markets a label-printing system under the name of LabelPro™ which enables a user to print information on individual die-cut labels of label sheets. The labels may then be peeled off the label sheet and adhered to files, index dividers, and so on. Although such a label-printing system is useful for generating professionally looking labels, it does not enable a user to print information on adhesive notes.

SUMMARY OF THE INVENTION

It is an object of the present invention to provide a computer-printable adhesive note system which overcomes the inadequacies of conventional adhesive notes.

It is another object of the invention to provide a computer-printable adhesive note system which enables a user to print information in a professional manner on adhesive notes.

It is yet another object of the invention to provide a computer-printable adhesive note system which dramatically increases the versatility of adhesive notes.

It is still another object of the present invention to provide a computer-printable adhesive note system which enables a user to print predetermined note templates, including graphics and text, on adhesive notes.

It is a further object of the invention to provide a computer-printable adhesive note system which increase the legibility and impact of adhesive notes.

It is still a further object of the present invention to provide a computer-printable adhesive note system which enables a user to customize adhesive notes on a desktop computer with existing word-processing programs.

It is yet a further object of the invention to provide a computer-printable adhesive note system which is compatible with commercially and widely available computers and printers.

These objects, as well as other objects, features, and benefits of the present invention, are achieved by providing a computer-printable adhesive note system for use with a computer and a printer. The computer may include a monitor, a drive, and an input device such as a keyboard and/or a mouse. The printer may include a manual feed tray. The computer-printable adhesive note system includes a note assembly which is loadable in the feed tray of the printer and an article of manufacture which is loadable into the drive of the computer.

According to one aspect of the invention, the note assembly includes a printing sheet having two surfaces, an adhesive strip formed on one of the surfaces of the printing sheet, and a backing sheet or strip removably adhered to the adhesive strip. The article of manufacture includes a storage medium which is readable by the drive of the computer. The plurality of instructions, which define computer software and are stored on the storage medium, includes instructions for (1) configuring the computer to receive, via the input device, information to be printed on the printing sheet of the note assembly and (2) configuring the printer to print the received information on the printing sheet of the note assembly.

In commercial use, the computer-printable adhesive note system of the present invention includes a plurality of the note assemblies, where each of the note assemblies may be configured differently from the other the note assemblies. Accordingly, the plurality of instructions may further include instructions for displaying a plurality of note configurations on the monitor of the computer. Each of the displayed note configurations corresponds to the configuration of one of the note assemblies. The plurality of instructions then enables one of the displayed note configurations to be selected, via the input device, such that the received information is printable on the printing sheet of the note assembly corresponding to the selected note configuration. For example, the plurality of note configurations may include a note configuration of approximately 4 inches by 3 inches and a note configuration of approximately 4 inches by 5 inches.

The plurality of instructions may further include instructions for displaying a plurality of feed tray configurations. Each of the displayed feed tray configurations corresponds to the configuration of feed trays of commercially available printers. The plurality of instructions then enables one of the displayed feed tray configurations to be selected, via the input device of the computer, such that the note assembly is loadable in the feed tray of the printer according to the selected feed tray configuration. For example, the plurality of feed tray configurations may includes a center feed configuration, a side feed configuration, and an ink-jet printer configuration, which are all commonly used manual feed tray configurations on commercially available printers.

According to another aspect of the present invention, the plurality of instructions includes instructions for displaying printing orientations of landscape and portrait on the monitor of the computer. The plurality of instructions then enables one of the displayed printing orientations to be selected, via the input device of the computer, such that the received information is printable on the printing sheet of the note assembly according to the selected printing orientation.

Another one of the aspects of the note assembly of the invention is that lines of perforations may be formed through the printing sheet, the adhesive strip, and the backing sheet, thereby dividing the note assembly into a plurality of notes. The plurality of instructions may then include instructions for configuring the printer to print the received information on the printing sheet of one of the notes of the note assembly.

According to yet another aspect of the present invention, the plurality of instructions further includes instructions for displaying a plurality of note specifiers on the monitor of the computer. Each of the displayed note specifiers corresponds to one of the notes of the note assembly. One of the displayed note specifiers is then selected, via the input device of the computer, such that the received information is printable on the printing sheet of the note corresponding to the selected note specifier.

According to a preferred embodiment of the computer-printable adhesive note system of the present invention in which the note assembly is divided into a plurality of individual notes, in addition to displaying the plurality of note specifiers on the monitor of the computer, a plurality of predetermined note types are also displayed on the monitor of the computer for each of the note specifiers. Each of the displayed predetermined note types corresponds to a different set of template information. Each set of template information is printable on the printing sheet of the note corresponding to the displayed note specifier. One of the displayed predetermined note types may then be selected, via the input device of the computer, for each of the note specifiers, such that the received information and the set of template information corresponding to the selected predetermined note type are printable on the printing sheet of the note corresponding to the note specifier.

One of the features of the invention is that the plurality of predetermined note types may be displayed in pull-down menus respectively corresponding to each of the note specifiers. By displaying the information in this manner, a user may easily and efficiently select one of the note types and then enter information to be printed thereafter. The information may be entered into fields included in the sets of template information.

One of the advantages of the present invention is that the note-printing computer software of the computer-printable adhesive note system may be compatible with existing word-processing programs. This enables the user to print information on the note assemblies without quitting the word-processing program and loading a dedicated software package. Further, the note assemblies are configured to be compatible with widely available printers. Accordingly, the note-printing system of the present invention is easy to use while being productive and efficient.

Other aspects, features, and advantages of the present invention will become apparent to those skilled in the art from a reading of the following detailed description with reference to the accompanying drawings.

BRIEF DESCRIPTION OF THE DRAWINGS

FIG. 3 is a perspective view of the note assembly, illustrating a back side thereof;

FIG. 4 is a cross-sectional view of the note assembly of the present invention taken along line 4—4 of FIG. 2;

FIG. 7 is a perspective view of a laser printer with a note assembly according to the invention loaded in the side-feed tray thereof;

FIG. 8 is a perspective view of an ink-jet printer with a note assembly according to the present invention loaded in the manual feed tray thereof.

DETAILED DESCRIPTION OF THE PREFERRED EMBODIMENTS

Figure 1:
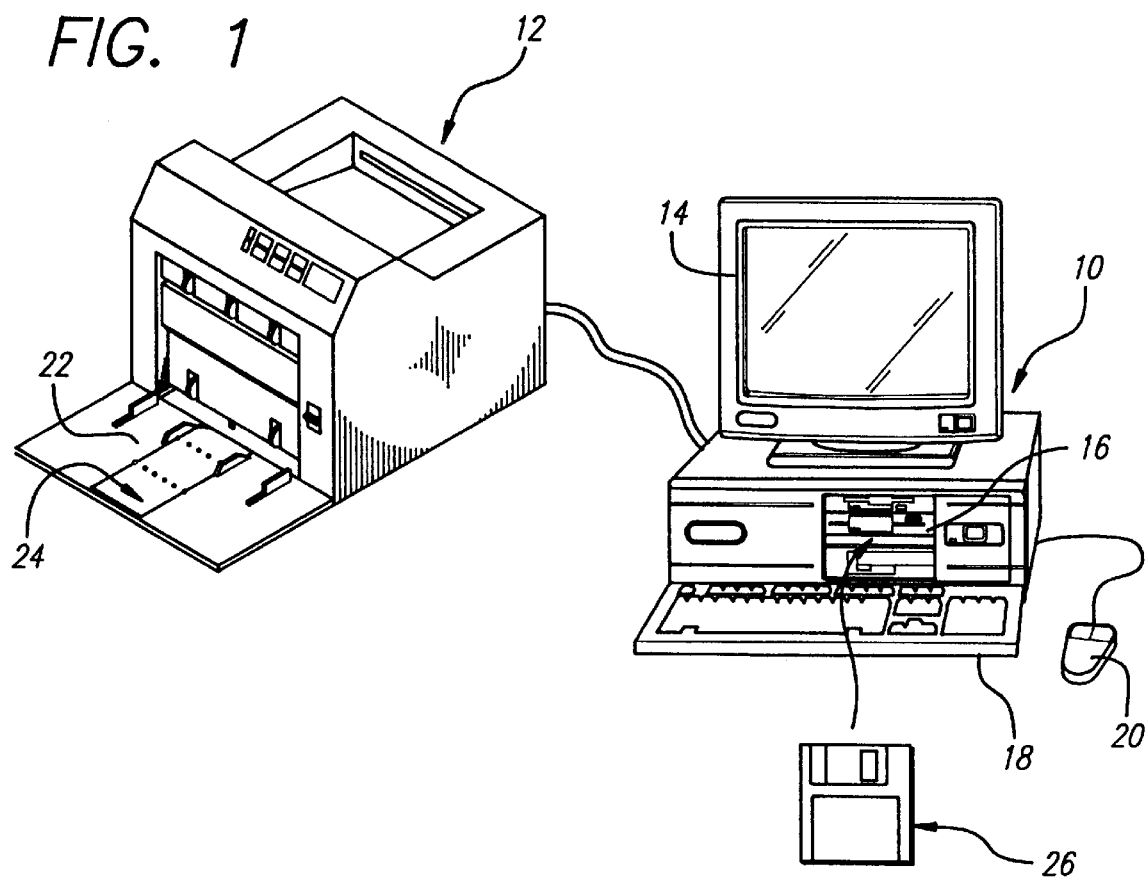
FIG. 1 is a perspective view of an exemplary embodiment of a computer-printable adhesive note system implemented in accordance with the principles of the present invention.

Referring to the drawings, particularly to FIG. 1, an exemplary embodiment of a computer-printable adhesive note system in accordance with the principles of the present invention is illustrated. The computer-printable adhesive note system utilizes a computerized printing system to print information on notes which may then be adhered to surfaces in a manner analogous to the adhesive notes described above.

A typical computerized printing system on which the present invention may be implemented includes a computer 10 connected to a printer 12. The computer 10 may include a monitor 14, a drive 16, and an input device such as a keyboard 18 and/or a mouse 20. The printer 12 may include a manual feed tray 22 such as the center-feed tray shown in the figure.

The computer-printable adhesive note system of the present invention includes a note assembly 24 and a plurality of computer-readable instructions stored on an article of manufacture, for example, a floppy disk 26. The floppy disk 26 stores a note-printing computer program which is readable by the drive 16 of the computer 10. The note-printing computer program, which includes the plurality of instructions stored on the magnetic storage medium of the floppy disk 26 in the form of computer-readable code, instructs the computer 10 and the printer 12 to perform operations necessary for printing information on the note assembly 24 loaded in the feed tray 22 of the printer 12. Generally speaking, the note-printing computer program enables a user to enter information on the computer 10 by means of the keyboard 18 and then print this information on the note assembly 24. Preferably, the note-printing computer program works in association with a word-processing program already loaded on an internal hard drive of the computer 10. Details of the note-printing computer program according to the principles of the present invention will be discussed in more detail below.

Figure 2:
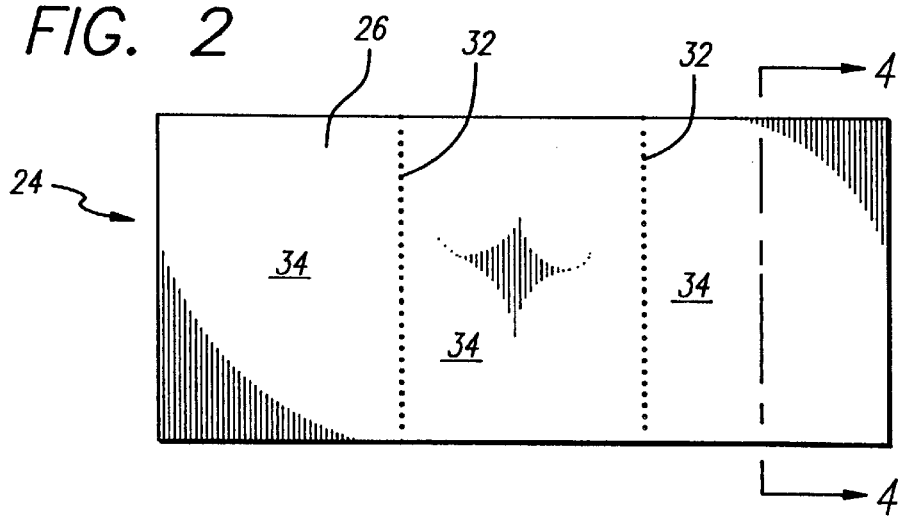
FIG. 2 is a plan view of a computer-printable note assembly according to the present invention, illustrating a front side thereof.

Referencing FIGS. 2, 3, and 4, the note assembly 24 includes a printing sheet 26, an adhesive strip 28, and a backing sheet or strip 30. The printing sheet 26 has two surfaces: a front surface as shown in FIG. 2 and a back surface as shown in FIG. 3. The front surface of the printing sheet 26 is preferably the surface on which the printer 12 prints information, and the back surface of the printing sheet 26 is the surface on which the adhesive strip 28 is formed.

Preferably, the adhesive strip 28 is formed along one edge of the printing sheet 26 as shown in FIGS. 3 and 4. The backing strip 30 is removably adhered to the adhesive strip 28 so that the backing strip 30 may be peeled off the adhesive strip 28 as desired. It is preferable, therefore, for the backing strip 30 to have a release coating (not shown) applied thereon.

With further reference to FIGS. 2 and 3, a preferred embodiment of the note assembly 24 further includes at least one but preferably a plurality (for example, two as shown) of lines of perforations 32. The perforations are formed through at least the printing sheet 26 (and adhesive strip 28) and may also be formed through the backing sheet 30 as shown in FIG. 3. The lines of perforations 32 divide the note assembly 24 into a plurality of notes 34. Each of the notes 34 may be removed from the note assembly 24 by cutting or tearing along a respective line of perforations 32, which is shown in FIG. 3.

One of the advantages of the computer-printable adhesive note system of the present invention is that the note-printing computer program stored on the floppy disk 26 utilizes existing word-processing software common on essentially all computerized printing systems. In order to implement the adhesive note system, the note-printing computer program (i.e., the plurality of instructions) is first installed into the computer 10, for example, onto an internal hard disk of the computer 10.

Figure 5:
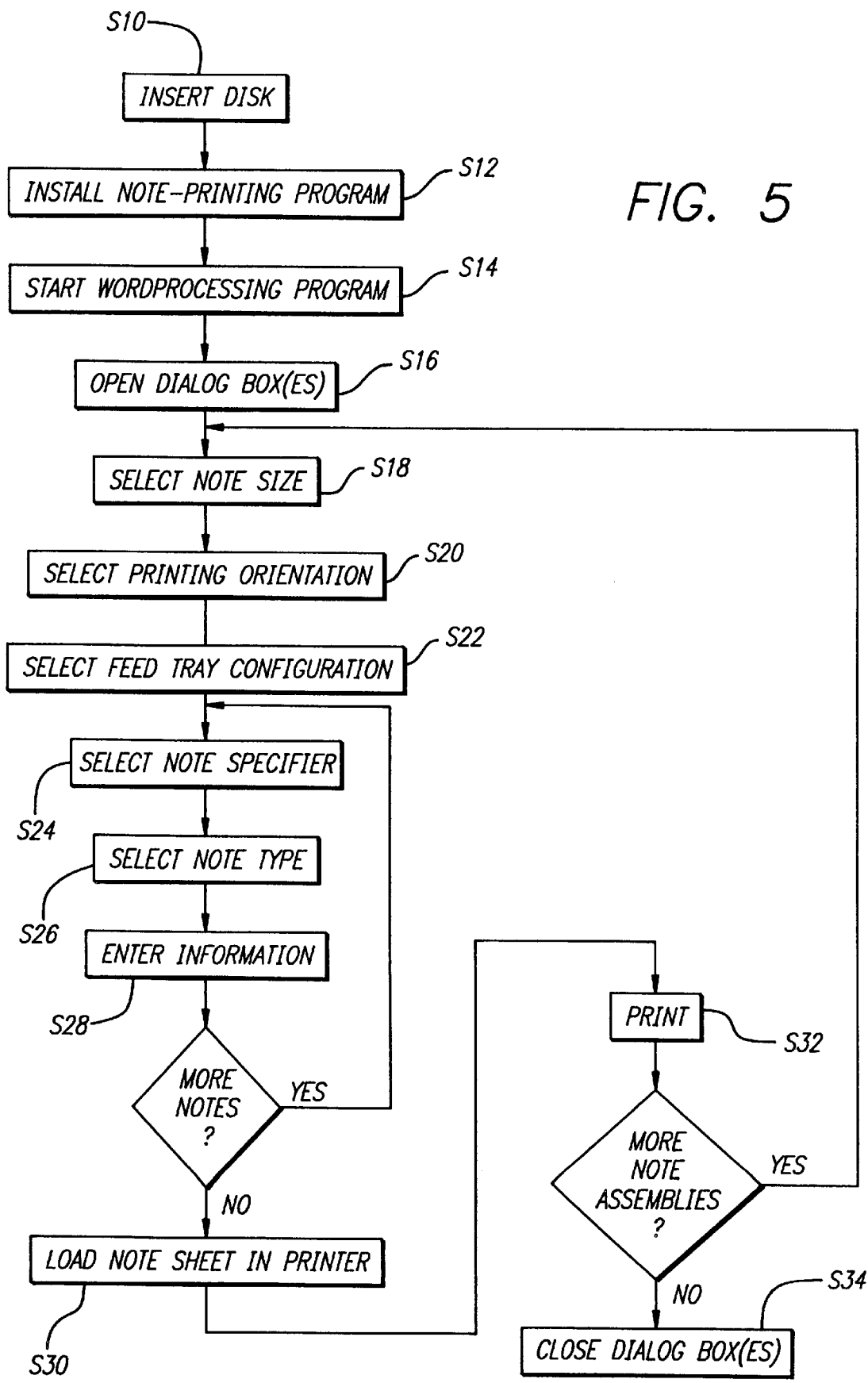
FIG. 5 is a flow diagram illustrating an exemplary note-printing process in accordance with the principles of the present invention.

To do this, the floppy disk 26 is inserted into the external disk drive 16 of the computer 10, which is represented by step S10 in FIG. 5. The note-printing computer program may then be installed on the computer 10 (step S12). Depending upon the platform of the computer 10, such as disk operations system (DOS) or Windows™, or the type of word-processing software utilized by the platform, such as Microsoft® Word or WordPerfect®, the installation procedure of the note-printing computer program in the computer 10 varies. In a Windows platform, RUN may then be selected on the FILE menu of the PROGRAM MANAGER, with the user then typing "a:setup" in the COMMAND LINE box and subsequently following instructions on the monitor 14. In a DOS platform, the user may type "a:setup" at the DOS prompt and then follow the subsequently displayed instructions. As those people skilled in the art of computer science understand the installation of computer programs onto computer systems, addition details of the installation procedure will not be provided herein.

Figure 6:
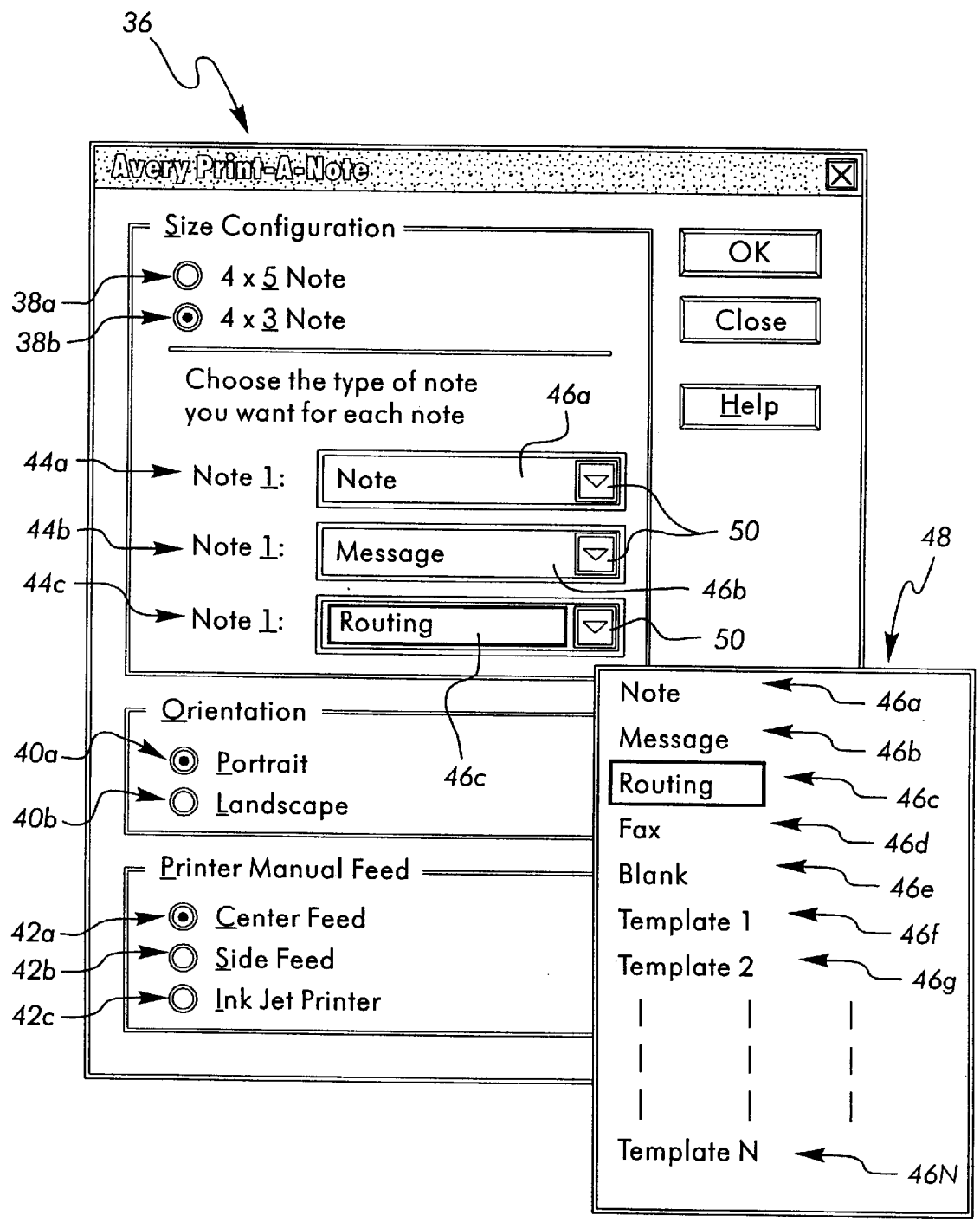
FIG. 6 is a schematic view of a dialog box configured according to note-printing computer software of the present invention, particularly illustrating a pull-down menu listing note types of the present invention.

After the note-printing computer program is installed on the computer 10, the word-processing program of the computer 10 is started (step S14). Within the wordprocessing program, the user then opens a dialog box 36 (step S16), an example of which is illustrated in FIG. 6. The dialog box 36 may be opened by choosing NEW from the FILE menu of the word-processing program. The dialog box 36 enables the user to select a particular configuration and type of note on which to print information.

More specifically, the note-printing computer software may display in the dialog box 36 a plurality of note configurations which are generally indicated by reference numeral 38 and specifically indicated with an added alpha, i.e., 38a and 38b, which convention is followed hereinunder. Each of the note configurations 38 corresponds to the configuration of the note assembly 24 or, more preferably, to the configuration of each of the notes 34 of the note assembly 24. The user then selects one of the note configurations (step S18). For example, the note-printing computer software stored on the floppy disk 26 may list in the dialog box 36 displayed on the monitor 14 a note having dimensions of 4 inches by 5 inches, i.e., note configuration 38a,
and a note having dimensions of 4 inches by 3 inches, i.e., note configuration 38b. If the note assembly 24 loaded in the feed tray 22 of the printer 12 to be printed on has overall dimensions of 4 inches by 12 inches and is equally divided into three notes 34 (each have dimensions of 4 inches by 3 inches) by the lines of perforations 32, then the user would select note configuration 38b, corresponding to the 4-inch-by-3-inch note, from the dialog box 36, as shown in FIG. 6. The selection may be made via either the keyboard 18 or the mouse 20. The computer program then configures the printer 12 to print information on one of the 4-inch-by-3-inch notes 34 of the note assembly 24.

The note-printing computer software may also display printing orientations 40 of PORTRAIT 40a and LANDSCAPE 40b in the dialog box 36 on the monitor 14. As known in the art, landscape indicates printing in the horizontal direction, and portrait indicates printing in the vertical direction. The note-printing computer software then enables the user to select one of the orientations 40 (step S20), for example, PORTRAIT 40a as shown in FIG. 6, and subsequently prints the information on the note assembly 24 according to the selected printing orientation 40.

Further, the note-printing computer software may display in the dialog box 36 a plurality of feed tray configurations 42 from which a user may select a particular feed tray configuration (step S22). Each of the feed tray configurations 42a–c corresponds to the configuration of feed trays of commercially available printers. For example, referencing FIGS. 7 and 8, the feed tray configurations 42 preferably include a CENTER FEED configuration 42a, corresponding to the feed trays 22 of the printers 12 shown in FIG. 1; a SIDE FEED configuration 42b, corresponding to the side feed tray 22 of the side feed printer 12 shown in FIG. 7; an INK-JET PRINTER configuration 42c, corresponding to the feed tray 22 of the ink-jet printer 12 shown in FIG. 8; and so on. The note-printing computer software will then configure the computerized system to print information on the note assembly 24 according to the selected feed tray configuration 42. Generally speaking, a printer which has two guides that associatively slide toward the center has a center feed configuration, and a printer which has one guide that slides to one side has a side feed configuration.

The note-printing computer software also preferably displays in the dialog box 36 a plurality of note specifiers 44 and a plurality of predetermined note types 46. Each of the note specifiers 44a–c corresponds to one of the notes 34 of the note assembly 24 having multiple notes. For example, NOTE 1 specifier 44a corresponds to the note 34 positioned at the leading edge (with respect to the direction the note assembly 24 travels through the printer 12) of the note assembly 24; NOTE 2 specifier 44b corresponds to the centrally positioned note 34 of the note assembly 24; and NOTE 3 specifier 44c corresponds to the note 34 positioned at the tailing edge of the note assembly 24. By selecting one of the note specifiers 44a–c (step S24), the note-printing computer software will configure the computerized system to print information on the note 34 corresponding to the selected note specifier 44.

For each of the note specifiers 44a–c, the user selects one of the note types 46a-N (step S26). It is preferable for the note types 46a-N to be selected by means of a pull-down menu 48 (or similar menu) activated by a corresponding icon 50. For example, as shown in FIG. 6, the icon 50 corresponding to note 3 specifier 44c may be clicked on by the mouse 20, thereby resulting in the pull-down menu 48 being activated with note type 46c (ROUTING) being selected and highlighted. By selecting one of the note types 46a-N, the software prints predetermined information corresponding to the selected note type 46 on the note 34 of the note assembly 24 corresponding to the note specifier 44.

More specifically, with additional reference to FIGS. 9 to 12, each of the predetermined note types 46a-N corresponds to a different set of template information 52a-N. The template information 52 provides a plurality of useful note types from which the user selects one particular type in which to add information specific to the selected note type. For example, template information 52a shown in FIG. 9, corresponding to note type 46a, provides a NOTE template; template information 52b shown in FIG. 10, corresponding to note type 46b, provides a MESSAGE template; template information 52c shown in FIG. 11, corresponding to note type 46c, provides a ROUTING template; and template information 52N shown in FIG. 12, corresponding to note type 46N, provides a THINGS-TO-DO template.

The template information 52 preferably includes, in plurality, permanent fields 54, semipermanent fields 56 (shown in long-dashed lines), and per-use fields 58 (shown in short-dashed lines). The permanent fields 54 may include graphics, text, lines, bullets, boxes, and so on. For example, the permanent fields 54 of template information 52a shown in FIG. 9 includes the text "PLEASE COPY . . ."; "Send Copies To:"; "Original:"; "Sent To:"; and "File Under:"; and graphics such as blank lines complementing the text. It is preferable to configure one set of template information 52 to represent a BLANK note (i.e., note type 46e) which does not include any permanent or semipermanent fields but, rather, is essentially one per-use field in which information such as text may be entered.

The semipermanent fields 56 may include text or graphics which are preferably used for each printing but that which may be changed if desired. For example, in a commercial embodiment of the present invention, upon installing the computer-printable adhesive note system on a computerized system 10, the user may desire to customize or personalize the note-printing system to his or her own company or identity. Specifically, the semipermanent field 56 of template information 52a shown in FIG. 9 states "Company Name Here" at which field the user may insert the name of his or her company or name which, in most cases, would not change from printing to printing.

Figure 9:
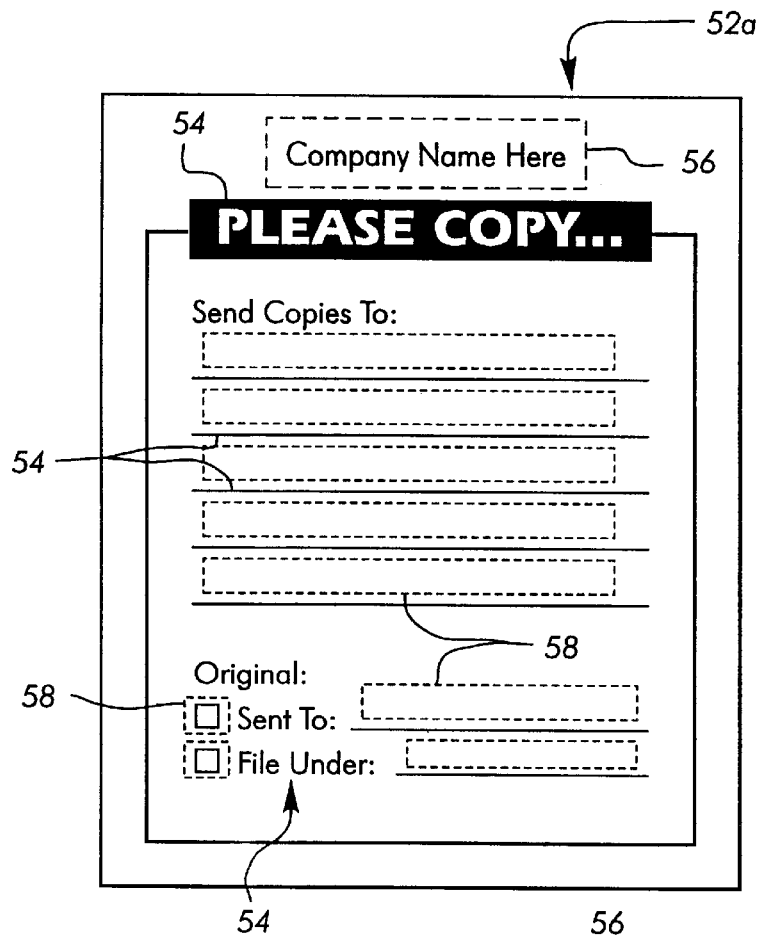
FIGS. 9–12 are schematic views of exemplary template information of note types in accordance with the principles of the present invention.
Figure 10:
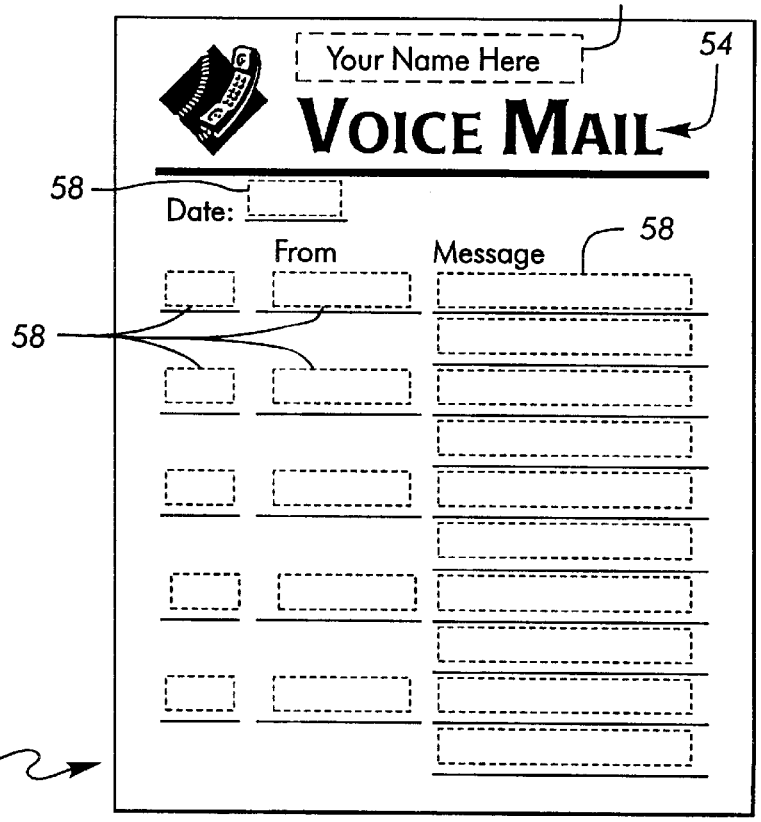
Figure 11:
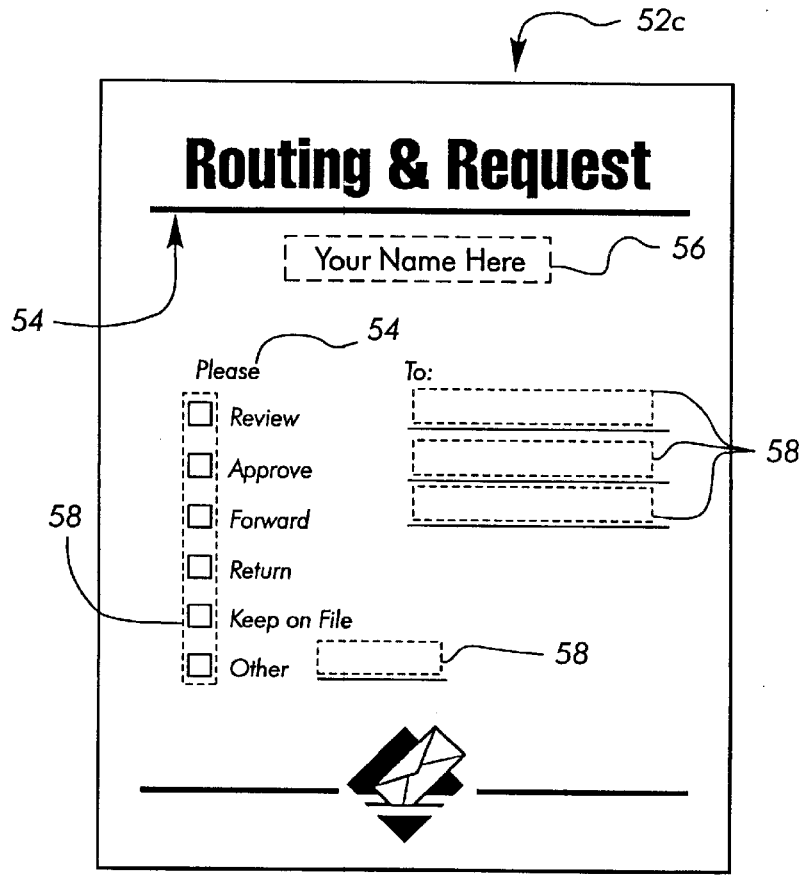
Figure 12:
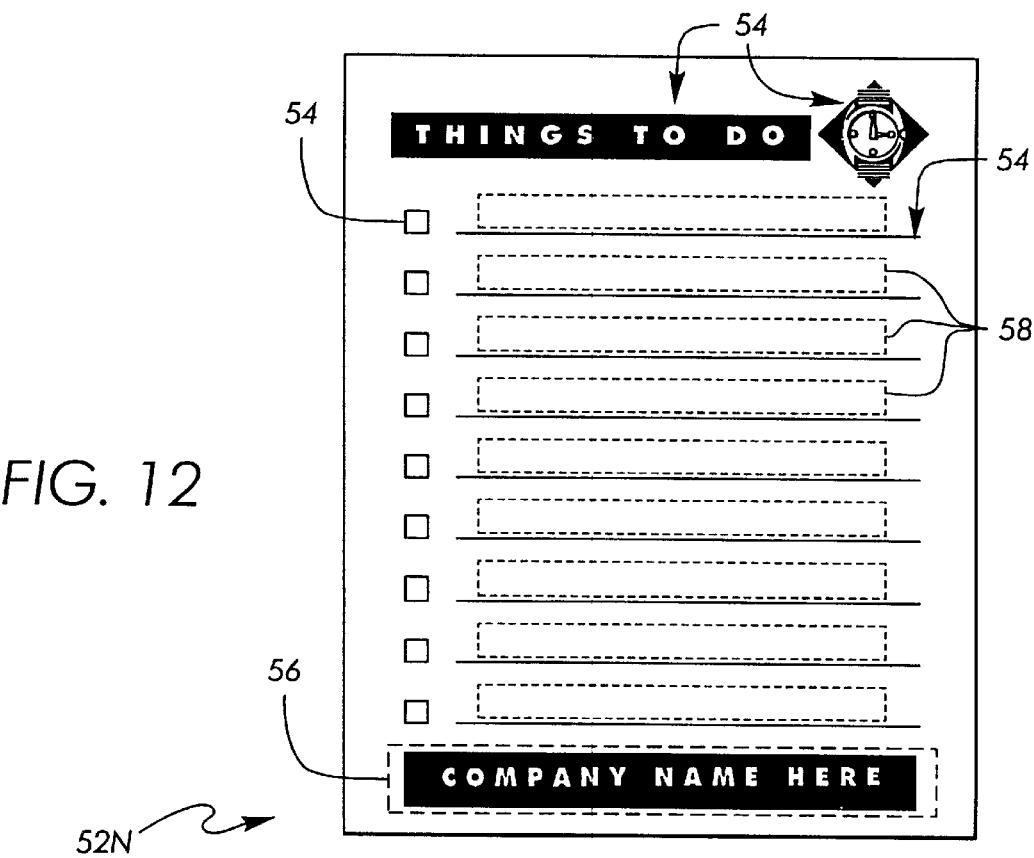

The per-use fields 58 provide the user with fields in which information may be entered (step S28) by means of the keyboard 18. For example, if note type 46a has been selected, then template information 52a as shown in FIG. 9 may be displayed on the monitor 14 with each of the per-use fields 58 highlighted. The user may then enter information on the keyboard 18 such as people's names (or check marks for the boxes next to "Sent To" and "File Under"), toggling from one field 58 to another by use of, e.g., the tab key on the keyboard 18 or the mouse 20. The entered information essentially represents a set of information which is to be printed. The note-printing computer software then configures the computerized system 10 to print the entered information in the corresponding per-use fields 58 of the template information 52 on the note 34 of the note assembly 24 corresponding to the selected note specifier 44.

Once the user has selected note types 46 for each of the note specifiers 44 and entered information to be printed, the note assembly 24 may be loaded into the manual feed tray 22 of the printer 12 (step S30). The entered information (as well as the template information 52) may then be respectively printed on the notes 34 of the note assembly 24 (step S32). The above-described process may be repeated for as many note assemblies 24 as desired. To complete the note-printing process and return to the wordprocessing program, the user may close the dialogue box 36 (step S34).

In printing with the note-printing system of the present invention, the user may need to format the computerized printing system 10 prior to printing information on the note assemblies 24. For example, if the user has selected a note configuration of 4 inches by 3 inches (i.e., note configuration 38b) and selected the PORTRAY printing orientation (i.e., printing orientation 40a), then the user may set the page margins in the word-processing software as shown in the following TABLE I, depending on the type of manual feed tray 22 of the printer 12. Note that all dimensions are in inches for this example.

TABLE I

|  | Top | Bottom | Left | Right |
| --- | --- | --- | --- | --- |
| Side Fed | 0.25 | 0.50 | 0.25 | 0.50 |
| Center Feed | 0.25 | 0.50 | 2.50 | 0.50 |
| Ink Jet | 0.25 | 0.50 | 0.25 | 0.50 |

The user may then create or insert a table with one column and three rows. The width of the column and the heights of the rows may be set by choosing CELL HEIGHT AND WIDTH or COLUMN and ROW commands under the "Table" heading in most word-processing programs. Using the information in TABLE I, the first, third, and fifth row heights may be set to 2.5 inches and the second row height may be set to 0.5 inch. The column width may be set to 3.5 inches. The user may then enter information to be printed in the taller cells in the created table and subsequently print the entered information as set forth above.

Alternatively, if the user has selected a note configuration of 4 inches by 3 inches (i.e., note configuration 38b) and selected the LANDSCAPE printing orientation (i.e., printing orientation 40b), then the user may set the page margins in the word-processing software as shown in the following TABLE II, depending on the type of manual feed tray 22 of the printer 12. Note that all dimensions are in inches for this example.

TABLE II

|  | Top | Bottom | Left | Right |
| --- | --- | --- | --- | --- |
| Side Feed | 0.25 | 4.75 | 1.25 | 0.25 |
| Center Feed | 2.50 | 2.50 | 1.25 | 0.25 |
| Ink Jet | 4.75 | 0.25 | 0.25 | 1.25 |

The user may then create or insert a table with one row and three columns, setting the column widths and the row height according to the dimensions provided in TABLE II. For example, the first and third column widths may be set to 4.5 inches with the second column width set to 0.5 inch. The row height may be set to 3.5 inches. Information may then be entered and printed according to the exemplary embodiments set forth above. The preferred margin settings presented in TABLES I and II the notes 34 and the note assemblies 24, the type of printer, the type of word-processing software, and so on.

The note-printing system of the present invention may be suitably modified from the exemplary embodiments described above. For example, if one or more particular note types 46 are commonly printed with substantially the same template information, particularly the same information in the per-use fields 58, then the computer program may configure the dialog box 36 to include a save/load feature which enables the user to load the commonly used note types for more efficient printing. The note-printing computer software may also configure the dialog box 36 to include a print icon (along with the OK, CLOSE, and HELP icons shown in FIG. 6) which may work in association with the printing feature of the word-processing software so that the entered information may be efficiently printed. Further, a user may create custom sets of template information by using the graphics features of the word-processing program on the computer system 10.

The note-printing computer software may be configured to work with any commercially available word-processing software packages and any commercially available printers. Examples of such word-processing software packages are Microsoft® Word and WordPerfect® for Windows™, Macintosh®, and DOS platforms. Examples of such printers are Hewlett-Packard® DeskJet™ and LaserJets™ printers, Canon® printers, Epson® Stylus™ printers, Apples® LaserWriter™ printers, and so on. The note assemblies 24 may be fed in the printers either manually or automatically. Further, more than one note assembly 24 may be loaded in the manual feed tray or the automatic feed tray of the printer at one time.

The note assembly 24 according to the present invention may be configured as a single sheet with three 4-inch-by-3-inch notes or two 4-inch-by-5-inch notes. The lines of perforations 32 are preferably microperforations which are formed by making at least about 35 cuts per inch. Accordingly, when the individual notes 34 are separated from the rest of the note assembly 24, the edges of the notes 34 are substantially smooth and free from course irregularities.

The plurality of instructions which compose the note-printing computer software described above are stored on a medium which is easily marketable and which facilitates the installation of the instructions on the computer 10. Accordingly, in addition to the floppy disk 26 shown in FIG. 1, the plurality of instructions may be stored on an optical disk, may be included in a software package bundled on the internal hard drive of the computer 10, or may be a tool or a subroutine of a word-processing software. Those skilled in the art will recognize many alternative avenues by which the plurality of instructions in accordance with the present invention may be implemented in conjunction with the computerized printing system, particularly the desk-top personal computer system shown in the drawings.

While it is preferable for the note assemblies 24 and the note-printing computer software to be marketed together in a commercial embodiment of the invention, each of these components may be distributed separately. This is particularly the case for the note assemblies 24 which consumers will have to maintain a supply as needed.

Those skilled in the art will understand that the preceding exemplary embodiments of the present invention provide the foundation for these as well as other numerous alternatives and modifications. These other alternatives and modifications are also within the scope of the present invention. Accordingly, the present invention is not limited to that precisely shown and described herein.

What is claimed is:

1. A computer-printable adhesive note system for use with a computer and a printer, the computer including a monitor, a drive, and an input device, the printer including a feed tray with a configuration, said system comprising:

a) a note assembly loadable in the feed tray of the printer and including:

(1) a printing sheet having two surfaces;
      (2) an adhesive strip formed on one of said surfaces of said printing sheet; and
      (3) a backing sheet removably adhered to said adhesive strip; and b) an article of manufacture including:

(1) a storage medium readable by the drive of the computer; and
      (2) a plurality of instructions stored on said storage medium and including instructions for:

(a) configuring the computer to display on the monitor a plurality of note-printing variables associated with said note assembly;
         (b) configuring the computer to enable said note-printing variables to be selected via the input device;
         (c) configuring the computer to receive information, via the input device, to be printed on said note assembly; and
         (d) configuring the computer and/or the printer to print said received information on said note assembly in accordance with said selected note-printing variables.

2. The computer-printable adhesive note system of claim 1 further comprising a plurality of said note assemblies, each of said note assemblies being configured differently from the other said note assemblies.

3. A computer-printable adhesive note system for use with a computer and a printer, the computer including a monitor, a drive, and an input device, the printer including a feed tray with a configuration, said system comprising:

a plurality of note assemblies each being loadable in the feed tray of the printer, configured differently from the other said note assemblies, and including a printing sheet having two surfaces, an adhesive strip formed on one of said surfaces of said printing sheet, and a backing sheet removably adhered to said adhesive strip; and an article of manufacture including a storage medium readable by the drive of the computer and a plurality of instructions stored on said storage medium, said plurality of instructions including instructions for:

configuring the computer to receive, via the input device of the computer, information to be printed on said printing sheet of said note assembly;

configuring the printer to print said received information on said printing sheet of said note assembly;

displaying a plurality of note configurations on the monitor of the computer, each of said displayed note configurations corresponding to the configuration of one of said note assemblies; and enabling one of said displayed note configurations to be selected, via the input device of the computer, such that said received information is printable on said printing sheet of said note assembly corresponding to said selected note configuration.

4. The computer-printable adhesive note system of claim 3 wherein said plurality of note configurations includes:

a note configuration of approximately 4 inches by 3 inches; and a note configuration of approximately 4 inches by 5 inches.

5. A computer-printable adhesive note system for use with a computer and a printer, the computer including a monitor, a drive, and an input device, the printer including a feed tray with a configuration, said system comprising:

a note assembly loadable in the feed tray of the printer and including a printing sheet having two surfaces, an adhesive strip formed on one of said surfaces of said printing sheet, and a backing sheet removably adhered to said adhesive strip; and an article of manufacture including a storage medium readable by the drive of the computer and a plurality of instructions stored on said storage medium, said plurality of instructions including instructions for:

configuring the computer to receive, via the input device of the computer, information to be printed on said printing sheet of said note assembly;

configuring the printer to print said received information on said printing sheet of said note assembly;

displaying a plurality of feed tray configurations on the monitor of the computer, each of said displayed feed tray configurations corresponding to the configuration of feed trays of commercially available printers; and enabling one of said displayed feed tray configurations to be selected, via the input device of the computer, such that said note assembly is loadable in the feed tray of the printer according to said selected feed tray configuration.

6. The computer-printable adhesive note system of claim 5 where said plurality of feed tray configurations includes:

a center feed configuration;

a side feed configuration; and an ink-jet printer configuration.

7. The computer-printable adhesive note system of claim 1 wherein said plurality of instructions further includes instructions for:

displaying printing orientations of landscape and portrait on the monitor of the computer; and enabling one of said displayed printing orientations to be selected, via the input device of the computer, such that said received information is printable on said printing sheet of said note assembly according to said selected printing orientation.

8. The computer-printable adhesive note system of claim 1 wherein:

said note assembly further includes a line of perforations formed through said printing sheet, said adhesive strip, and said backing sheet, said line of perforations dividing said note assembly into two notes; and said plurality of instructions further includes instructions for configuring the printer to print said received information on said printing sheet of one of said notes of said note assembly.

9. The computer-printable adhesive note system of claim 8 wherein said note assembly further includes a plurality of lines of perforations dividing said note assembly into a plurality of notes.

10. A computer-printable adhesive note system for use with a computer and a printer, the computer including a monitor, a drive, and an input device, the printer including a feed tray with a configuration, said system comprising:

a note assembly loadable in the feed tray of the printer and including a printing sheet having two surfaces, an adhesive strip formed on one of said surfaces of said printing sheet, a backing sheet removably adhered to said adhesive strip, and a plurality of lines of perforations formed through said printing sheet, said adhesive strip, and said backing sheet, said plurality of lines of perforations dividing said note assembly into a plurality of notes; and an article of manufacture including a storage medium readable by the drive of the computer and a plurality of instructions stored on said storage medium, said plurality of instructions including instructions for:

configuring the computer to receive, via the input device of the computer, information to be printed on said printing sheet of said note assembly;

configuring the printer to print said received information on said printing sheet of said note assembly;

configuring the printer to print said received information on said printing sheet of one of said notes of said note assembly;

displaying a plurality of note specifiers on the monitor of the computer, each of said displayed note specifiers corresponding to one of said notes of said note assembly; and enabling one of said displayed note specifiers to be selected, via the input device of the computer, such that said received information is printable on said printing sheet of said note corresponding to said selected note specifier.

11. The computer-printable adhesive note system of claim 10 wherein said plurality of instructions further includes instructions for:

displaying a plurality of predetermined note types on the monitor of the computer, each of said displayed predetermined note types corresponding to a different set of template information, each said set of template information being printable on said printing sheet of any one of said notes of said note assembly;

enabling one of said displayed predetermined note types to be selected, via the input device of the computer, such that said received information and said set of template information corresponding to said selected predetermined note type are printable on said printing sheet of said note corresponding to said selected note specifier.

12. A computer-printable adhesive note system for use with a computer and a printer, the computer including a monitor, a drive, and an input device, the printer including a feed tray with a configuration, said system comprising:

a note assembly loadable in the feed tray of the printer and including a printing sheet having two surfaces, an adhesive strip formed on one of said surfaces of said printing sheet, a backing sheet removably adhered to said adhesive strip, and a plurality of lines of perforations formed through said printing sheet, said adhesive strip, and said backing sheet, said plurality of lines of perforations dividing said note assembly into a plurality of notes; and an article of manufacture including a storage medium readable by the drive of the computer and a plurality of instructions stored on said storage medium, said plurality of instructions including instructions for:

configuring the computer to receive, via the input device of the computer, information to be printed on said printing sheet of said note assembly;

configuring the printer to print said received information on said printing sheet of said note assembly;

configuring the printer to print said received information on said printing sheet of one of said notes of said note assembly;

displaying a plurality of note specifiers on the monitor of the computer, each of said displayed note specifiers corresponding to one of said notes of said note assembly;

displaying a plurality of predetermined note types on the monitor of the computer for each of said note specifiers, each of said displayed predetermined note types corresponding to a different set of template information, each said set of template information being printable on said printing sheet of said note corresponding to said displayed note specifier; and enabling one of said displayed predetermined note types to be selected, via the input device of the computer, for each of said note specifiers, such that said received information and said set of template information corresponding to said selected predetermined note type are printable on said printing sheet of said note corresponding to said note specifier.

13. The computer-printable adhesive note system of claim 12 wherein said plurality of instructions:

configures the computer to receive, via the input device of the computer, sets of information, each of said received sets of information corresponding to one of said note specifiers; and configures the printer to print each of said received sets of information on said printing sheet of said note corresponding to each of said note specifiers.

14. The computer-printable adhesive note system of claim 12 wherein said plurality of instructions displays said plurality of predetermined note types in pull-down menus respectively corresponding to each of said note specifiers.

15. The computer-printable adhesive note system of claim 12 wherein said sets of template information include a plurality of fields;

said plurality of instructions further including instructions for configuring the computer to receive field information for each of said fields of said sets of template information.

16. The computer-printable adhesive note system of claim 1 wherein said storage medium is a magnetic floppy disk.

17. The computer-printable adhesive note system of claim 1 wherein said adhesive strip is formed of pressure-sensitive adhesive.

18. The computer-printable adhesive note system of claim 1 wherein said backing sheet is configured substantially the same as said adhesive strip.

19. The computer-printable adhesive note system of claim 1 wherein said backing sheet includes a release coating.

20. A method of printing information on a note assembly with a computer and a printer, the note assembly including a plurality of notes, the computer including a monitor and an input device, the printer including a manual feed tray with a configuration, said method comprising the steps of:

a) configuring the computer to display on the monitor a plurality of note-printing variables associated with the note assembly;

b) configuring the computer to enable said note-printing variables to be selected via the input device;

c) configuring the computer to receive information, via the input device, to be printed on the note assembly; and d) configuring the computer and/or the printer to print said received information on the note assembly in accordance with said selected note-printing variables.

21. The method of claim 20 wherein said plurality of note-printing variables includes:

a plurality of note configurations; and a plurality of note types.

22. The method of claim 21 wherein said plurality of note-printing variables further includes:

a plurality of printing orientations; and a plurality of feed tray configurations.

23. The method of claim 21 wherein said plurality of note-printing variables further includes:

a plurality of note specifiers each corresponding to one of the notes of the note assembly;

said plurality of note types being displayed for each of said note specifiers.

24. The method of claim 21 wherein each of said note types includes a set of template information;

at least one of said sets of template information including fields in which information to be printed on the note assembly is received.

25. The method of claim 24 wherein at least one of said sets of template information includes a permanent field which is printable on the note assembly.

26. A method of printing information on a note assembly with a computer and a printer, the note assembly including a plurality of notes, the computer including a monitor and an input device, the printer including a manual feed tray with a configuration, said method comprising the steps of:

a) defining a printing configuration by selecting a number of note-printing variables from a plurality of note-printing variables displayed on the monitor;

b) entering information to be printed via the input device;

c) loading the note assembly in the manual feed tray of the printer; and d) printing said entered information on the note assembly in accordance with said defined printing configuration.

27. The method of claim 26 wherein said defining step includes the steps of:

selecting a note configuration from a plurality of note configurations; and selecting a note type from a plurality of note types.

28. The method of claim 26 wherein said defining step includes the steps of:

selecting a printing orientation from a plurality of printing orientations; and selecting a feed tray configuration from a plurality of feed tray configurations.

29. The method of claim 26 wherein said plurality of note-printing variables includes a plurality of note specifiers each corresponding to one of the notes of the note assembly;

said defining step including the step of selecting a note type from a plurality of note types for at least one of said note specifiers, each of said note types including a field in which information to be printed is entered.

30. The method of claim 26 wherein the note assembly includes an adhesive strip, a backing sheet removably adhered to the adhesive strip, and lines of perforations dividing the note assembly into the plurality of notes, the method further comprising the step of:

separating a note from the note assembly along one of the lines of perforations after printing said information on the note.

31. The method of claim 30 further comprising the step of:

removing the backing sheet from the adhesive strip so that the note may be adhered to a surface.

32. An article of manufacture including:

a) a storage medium readable by a drive of a computer; and b) a plurality of instructions stored on said storage medium and including instructions for:

(1) configuring the computer to display on a monitor a plurality of note-printing variables associated with a note assembly including a plurality of notes;

(2) configuring the computer to define a printing configuration in accordance with a selected number of said note-printing variables;

(3) configuring the computer to receive, via an input device of the computer, information to be printed on the note assembly; and (4) configuring a printer connected to the computer to print said received information on the note assembly in accordance with said printing configuration.

33. The article of manufacture of claim 32 wherein said plurality of note-printing variables includes:

a plurality of note configurations each corresponding to a configuration of one of the notes of the note assembly; and a plurality of note types each including a set of template information which is complementary printable with said received information on the note assembly.

34. The article of manufacture of claim 33 wherein said plurality of note-printing variables further includes:

a plurality of note specifiers each corresponding to one of the notes of the note assembly, said plurality of note types being displayed for each of said note specifiers.

35. The article of manufacture of claim 33 wherein each said set of template information includes a field in which information to be printed is entered.

36. The article of manufacture of claim 32 wherein said plurality of instructions includes instructions for displaying said plurality of note-printing variables in a dialog box on the display of the computer.

37. The article of manufacture of claim 35 wherein said plurality of instructions includes instructions for displaying said plurality of note types in a pull-down menu in association with said note specifiers displayed in said dialog box.

* * * * *